United States Patent
Asefi et al.

(10) Patent No.: US 12,306,987 B2
(45) Date of Patent: May 20, 2025

(54) DYNAMIC OBFUSCATION OF INFORMATION

(71) Applicant: Wells Fargo Bank, N.A., San Francisco, CA (US)

(72) Inventors: Azita Asefi, Vacaville, CA (US); Preet Pratik Panda, Concord, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 204 days.

(21) Appl. No.: 18/314,991

(22) Filed: May 10, 2023

(65) Prior Publication Data

US 2024/0378313 A1  Nov. 14, 2024

(51) Int. Cl.
*G06F 21/62* (2013.01)
*G06F 9/451* (2018.01)

(52) U.S. Cl.
CPC .......... *G06F 21/6245* (2013.01); *G06F 9/451* (2018.02)

(58) Field of Classification Search
CPC ... G06F 21/6245; G06F 9/451; G06F 21/6254
See application file for complete search history.

(56) References Cited

U.S. PATENT DOCUMENTS

| | | | |
|---|---|---|---|
| 8,117,560 B1 | 2/2012 | Lu et al. | |
| 8,271,574 B1 | 9/2012 | Srinivasan et al. | |
| 9,030,495 B2 | 5/2015 | McCulloch et al. | |
| 11,461,436 B1 | 10/2022 | Balmakhtar et al. | |
| 2011/0206285 A1* | 8/2011 | Hodge | G06F 21/84 382/224 |
| 2016/0300075 A1 | 10/2016 | Stankiewicz et al. | |
| 2016/0321468 A1 | 11/2016 | Stankiewicz et al. | |
| 2021/0073041 A1* | 3/2021 | Cheng | G06N 20/00 |
| 2022/0060661 A1 | 2/2022 | Truong et al. | |
| 2023/0409747 A1* | 12/2023 | Pierce | G06F 21/14 |
| 2023/0419635 A1* | 12/2023 | Beauchamp | G06V 10/235 |

FOREIGN PATENT DOCUMENTS

| | | |
|---|---|---|
| CA | 2894751 C | 8/2022 |
| WO | 2008/025614 A2 | 3/2008 |

* cited by examiner

*Primary Examiner* — Abiy Getachew
(74) *Attorney, Agent, or Firm* — Merchant & Gould P.C.

(57) ABSTRACT

Dynamic obfuscation of information displayed on a user interface. In examples, the user interface is generated by a host application, and a data field obfuscation tool is provided as an extension of the host application and configured to dynamically obfuscate one or more data fields displayed on the user interface. In examples, the data field obfuscation tool can be configured, enabled and/or disabled by a user via another user interface.

19 Claims, 6 Drawing Sheets

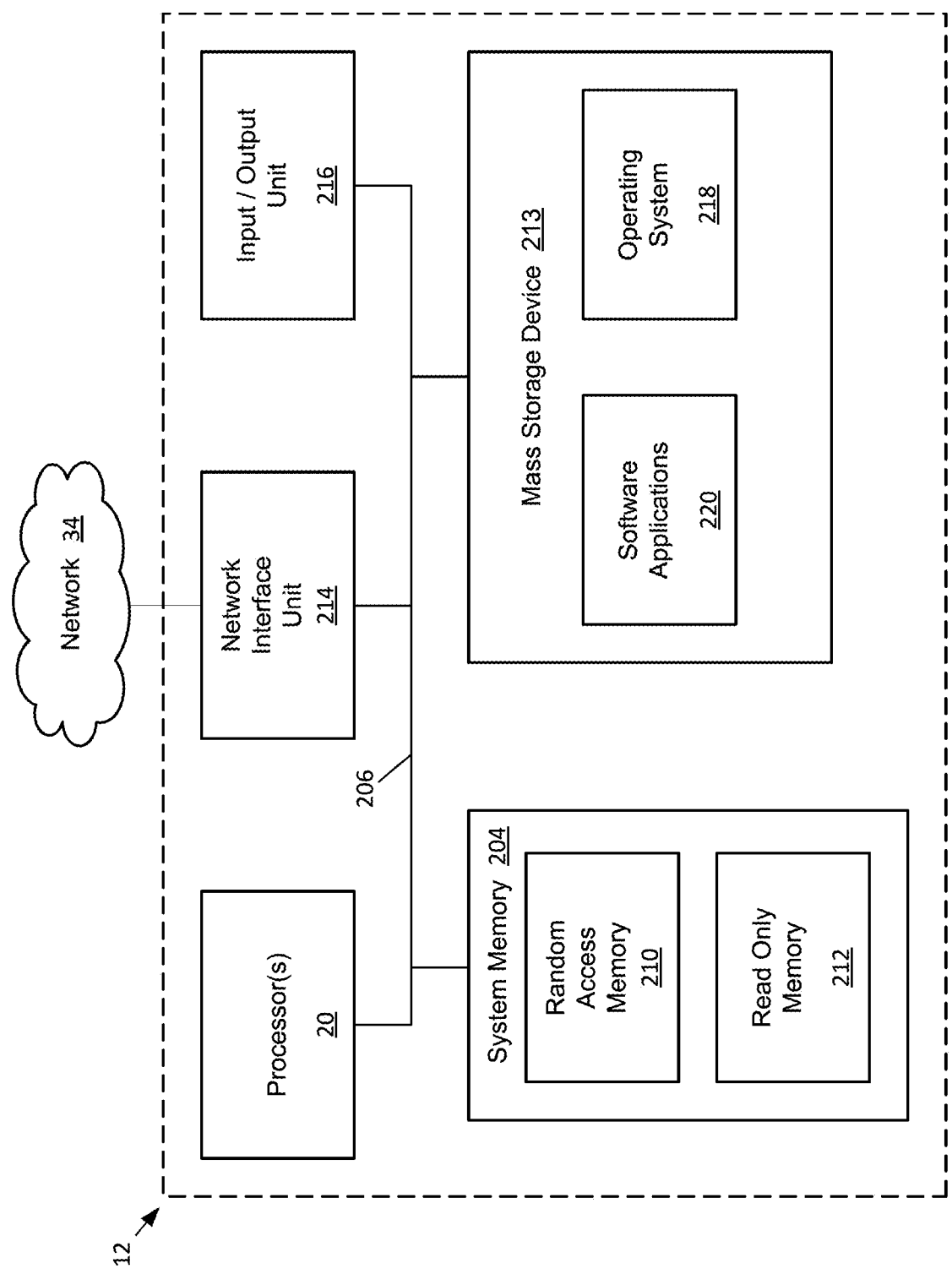

DYNAMIC OBFUSCATION OF INFORMATION

BACKGROUND

Content of a user interface of a host computing device is commonly shared with or shown to other users, or shared with other user devices of other users. In many contexts, the content of the user interface of the host computing device includes data fields that may include sensitive information that should not be shared with or readable by a user to whom the user interface is being shown or with whom the user interface is being shared.

SUMMARY

In general terms, the present disclosure is directed to dynamic obfuscation of a data field of a user interface generated by a host application.

In one aspect, a data field obfuscation system, includes: one or more processors; and non-transitory computer-readable storage media encoding instructions which, when executed by the one or more processors, causes the system to: generate a user interface configured to selectively enable and disable a data field obfuscation tool, the data field obfuscation tool: when enabled via the user interface, being configured to obfuscate a data field of a main user interface; and when disabled via the user interface, being configured to allow data in the data field to be readable or otherwise recognizable.

In another aspect, a computer-implemented data field obfuscation tool includes: an extension for a host application that, when added to the host application, does not change operability of the host application and does not change any data generated or stored by the host application, the extension, when added to the host application, being configured to obfuscate a data field of a main user interface generated by the host application.

In another aspect, a computer-implemented method of data field obfuscation, includes: generating a user interface configured to selectively, by a user, enable and disable a data field obfuscation tool, the data field obfuscation tool: when enabled via the user interface, being configured to obfuscate a data field of a main user interface; and when disabled via the user interface, being configured to allow text in the data field to be readable; and when the data field obfuscation tool is enabled, executing the data field obfuscation tool to make text in the data field unreadable and to at least one of: (i) use a machine learning model to locate the data field on the main user interface; or (ii) perform optical character recognition to recognize text within a digital image on the main user interface to locate the data field on the main user interface, wherein the data field obfuscation tool is configured as an extension of a host application that generates the main user interface; and wherein the extension does not change operability of the host application and does not change any data generated or stored by the host application.

The details of one or more techniques are set forth in the accompanying drawings and the description below. Other features, objects, and advantages of these techniques will be apparent from the description, drawings, and claims.

DESCRIPTION OF THE DRAWINGS

FIG. 6 schematically shows example computing components of a computing device of the system of FIG. 1.

DETAILED DESCRIPTION

Figure 1:
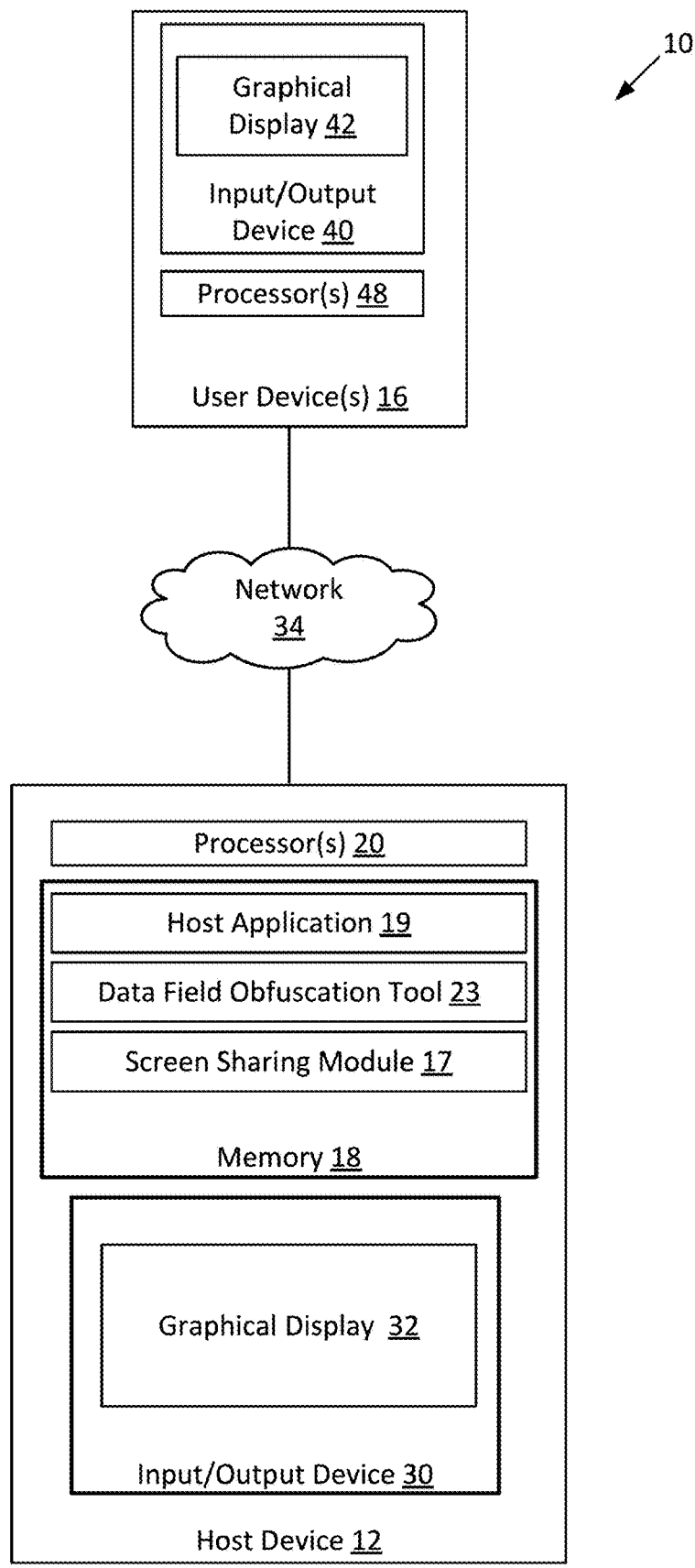
FIG. 1 schematically shows components of an example system for performing dynamic obfuscation of information.

The present disclosure is directed to dynamically obfuscating information displayed by a computing device.

It is commonplace in many contexts to show and share user interfaces generated by a host computing device with other users or with other devices operated by other users. In certain examples, another user is simply physically present at the host device and can see the display of the host device. In other examples, the user interface being displayed on the host device is projected elsewhere, either onto a screen, or via a network to a display of another computing device. For instance, several virtual meeting applications allow host users to share their screen with the user devices of others who are attending a virtual meeting via the meeting application.

In many situations in which a host user interface is being shown to or shared with other users, it is undesirable for the other users to be able to see certain information, such as sensitive information or confidential information, that may be displayed on the host user interface.

In one example situation, a production team of a business enterprise shares a user interface of a production application with another team of the enterprise or with an outside vendor for purposes of troubleshooting or testing the production application. To demonstrate functionality of and properly test the production application, the production team may need to include real data in data fields of the application that are displayed by the application, such as information about an individual such as a customer of the enterprise or a member of the production team. The real data could include sensitive information, such as a name, an address, a social security number, a credit card number, a financial account number, etc. that should not be viewed by the other team or the outside vendor.

In another example situation, functionality of an application is recorded for training purposes. To demonstrate the functionality for purposes of the training recordation, real data may need to be entered into data fields of the user interface of the application that is displayed by the application, which data can include sensitive information that should not be viewed by those watching the training recording.

In another example situation, a host device presents an application user interface showing sensitive information in different data fields during a conference or during a virtual conference.

In another example situation, an employee of an enterprise may be working at an offsite location with an application having a user interface showing sensitive information in different data fields that should not be viewed by others at the offsite location, where the offsite location is not managed or controlled by the enterprise.

In another example situation, an executive of an enterprise may share with shareholders their application user interface showing sensitive information in different data fields that should not be viewed by the shareholders.

In another example situation, a salesperson may share with customers their application user interface showing sensitive information in different data fields that should not be viewed by the customers.

Many other example situations could occur in which the user interface of an application on a host computing device is being shared with another user and displays sensitive information in one or more data fields, which sensitive information should not be viewed, for one or more reasons (e.g., legal reasons, privacy reasons, administrative reasons, internal policy reasons, compliance reasons, security reasons, etc.) by that other user.

Advantageously, aspects of the present disclosure improve obfuscation of sensitive information on a graphical user interface displayed on a display device.

One example improvement made possible by aspects of the present disclosure is that data field obfuscation functionality, rather than being executed as a separate application stored on a computing device, and rather than being generalized to all applications that may run on a given computing device, is instead built into the underlying host application that generates the user interface having sensitive information that must be obfuscated.

Another example improvement made possible by aspects of the present disclosure is the ability to dynamically enable and disable, for a specific host application, data field obfuscation functionality. For example, a user of the host application during a presentation in which the user shares a user interface of the host application that contains sensitive information, may need to view the sensitive information again once the user interface stops being shared. Aspects of the present disclosure allow the user to quickly navigate, within the user interface of the host application itself, to another interface that allows the user to enable and disable data field obfuscation functionality for that user interface of the host application.

Another example improvement made possible by aspects of the present disclosure is an improvement in the underlying host application itself, in that data field obfuscation functions can be built into an extension (e.g., a plugin) of the underlying host application, which can improve the computing resource consumption efficiency, as well as the overall operating efficiency, from both the computing standpoint and the user's standpoint, of the underlying host application.

Another example improvement made possible by aspects of the present disclosure is that the underlying data and operation of the host application is not changed by the obfuscation functions that are added on to the host application, which can improve the underlying host application's computing resource consumption efficiency, as well as the overall operating efficiency from both the computing standpoint and the user's standpoint.

Another example improvement made possible by aspects of the present disclosure is a data field obfuscation tool that pairs data field identifiers to different metadata types associated with the underlying host application, which can result in greater likelihood that data fields that may contain sensitive information will be located and obfuscated.

Another example improvement made possible by aspects of the present disclosure is a data field obfuscation tool that, when enabled, obfuscates data fields of a user interface of an underlying host application while that user interface is loading and before it is fully loaded, such that there is no time gap between when the data fields become on display and when they those data fields are obfuscated.

Another example improvement made possible by aspects of the present disclosure is a data obfuscation tool that obfuscates a data field even while data is being entered into or deleted from that data field.

Another example improvement in efficiency and accuracy of data field obfuscation made possible by the present disclosure is a data field obfuscation tool that is configured to locate a data field of a user interface using a machine learning model and/or optical character recognition.

These example improvements result in one or more practical applications of the disclosed technology. Additional advantages and improvements will be apparent from the present disclosure.

FIG. 1 schematically shows components of an example system 10 according to the present disclosure. The system 10 includes a host device 12 and one or more user device(s) 14.

In some examples, all of the components of the host device 12 are incorporated in a single local device or terminal of a host user. In other examples, components of the host device 12 can be distributed among a local device and a remote device such as a server that communicates with the local device via the network 34. For instance, the memory 18 or a portion of the memory 18 can be stored on a server while the input/output (I/O) device 30 is a component of the local device.

In some examples that include a server, the data field obfuscation tool 23 as well as the underlying host application 19 are run by the server and the user interfaces so generated are provided by the local device. In other examples that include a server, the underlying host application 19 is run by the server and the data field obfuscation tool 23 is run by the remote device. In other examples that include a server, aspects of the underlying host application 19 are run by the server, while other aspects of the underlying host application 19 and the data field obfuscation tool 23 are run by the local device. User interfaces generated by the host application and the data field obfuscation tool 23 are provided to, and output by, the local device.

In examples that include a server, in some instances the server device can be a private server, e.g., of a business enterprise. In other instances, the server can be a shared server, such as a cloud to which users of a given enterprise have selective, private access.

The following description of FIG. 1 assumes that host device 12 is a single device, such as local device associated with a host user of a business enterprise.

The host device 12 is a computing device, such as a laptop computer, a desktop computer, a tablet computer, a smartphone, etc. For instance, the host device 12 is associated with a host user who opens and runs a host application 19 on the host device 12 and may desire a times, and depending on the use context, to obfuscate information on a user interface generated by the host application.

The host device 12 is a computing device configured to provide dynamic obfuscation of data fields of a user interface generated by an underlying host application and displayed by the host device 12.

The host device 12 includes one or more processor(s) 20 configured to process data and execute computer readable instructions stored on the memory 18, for performing functions of the host device 12 described herein. For example, the processor(s) 20 can be configured to carry out the functionality of the host application 19 and the data field obfuscation (DFO) tool 23.

The memory 18 stores the host application 19 and the DFO tool 23, which are processed and executed by the processor(s) 20. User interfaces (e.g., graphical user interfaces) are generated using the host application 19 and the DFO tool 23 and displayed using the input/output (I/O) device 30, and particularly the graphical display 32 of the I/O device 30, which is configured to display a user interface generated by the host application 19. The I/O device 30 can also include, for example, one or more of a touch screen, a microphone, a speaker, a stylus, a pen, a mouse and so forth.

The host application 19 can be any application that generates graphical user interfaces. In some examples, the host application 19 is a web-based application. In some examples, the host application 19 is a web browser, such as Chrome from Google or Edge from Microsoft. In some examples, the host application 19 is a web-based application, such as a web browser. In some examples, the host application 19 has a component that runs on a remote server and a component that runs locally on the host device 12. In some examples, the host application is not a web-based application.

In some examples, the DFO tool 23 is configured as an extension of the host application 19. In some examples, the DFO tool is configured as an extension of a locally stored component of the underlying host application 19, while the host application 19 includes another component that is stored on and run by a remote device, such as a server. A non-limiting example of an extension, as that term is used herein, is a plugin.

In some examples, the DFO tool 23 is an extension of the host application 19 and is configured so as to not change any data generated or stored by the host application 19. For example, the underlying functionality of the host application 19 is not altered by the DFO tool 23, nor is data that may be displayed using the host application altered or deleted. Rather, the DFO tool works only to obfuscate the visual appearance of the data, while the underlying data itself remains unaltered.

The memory 18 of the host device 12 also stores a screen sharing module 17. The screen sharing module 17 is configured to allow the host device 12 to selectively share (or project) its user interfaces (e.g., graphical user interfaces) with other devices, such as the user device(s) 16. In some examples, the screen sharing module 17 is a component of a virtual conferencing application that can be applied regardless of what application is generating the user interface. In some examples, the screen sharing module 17 can be incorporated into a specific application (such as the host application 19) and is configured to share only user interfaces generated by that application. Other example configurations and functionalities of the screen sharing module 17 are possible.

The system 10 includes one or more user devices 16. Each user device 16 can be a device associated with a user with whom a user interface generated by the host application 19 is being shown to or shared. For example, a user device 16 can be associated with a member of another team of the business enterprise, or with an outside vendor, or with a shareholder.

Each user device 16 includes one or more processor(s) 28 and an input/output (I/O) device 40. The I/O device 40 includes a graphical display 42 configured to display a user interface generated by the host device 12 and shared by the host device 12 with the user device 16. The I/O device 40 can also include, for example, a touch screen, a microphone and/or a speaker. The processor(s) 28 can execute computer readable instructions for performing functions of the user device 16, such as receiving and processing shared user interfaces from the host device 12 and displaying those shared user interfaces via the graphical display 42.

The host device 12 (or any remote components of the host device 12 if it consists of distributed hardware and software not all of which is local), and the user device(s) 16, are interconnected via a network 34. The network 34 can be any suitable data network, such as the internet, a wide area network, a local area network, a wired network, a wireless network, a cellular network, a satellite network, a near field communication network, or any operatively connected combination of these. Shared user interfaces generated by the host application 19 can be provided to the user device(s) 16 via the network 34 and using the screen sharing module 17.

Figure 2:
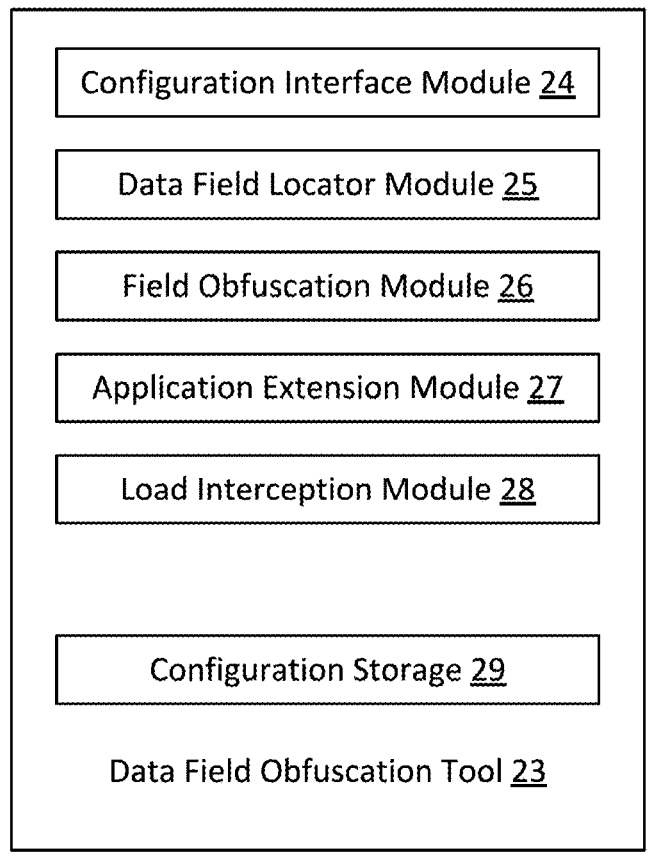
FIG. 2 schematically shows components of the data field obfuscation tool of the system of FIG. 1.

FIG. 2 schematically shows components of the data field obfuscation tool 23 of the system 10 of FIG. 1.

Referring to FIG. 2, the DFO tool 23 includes a configuration interface module 24, a data field locator module 25, a field obfuscation module 26, an application extension module 27, a load interception module 28, and a configuration storage 29.

Referring to FIGS. 1-2, the configuration interface module 24 is configured to generate a configuration interface that can be presented to and adjusted by the host user via the graphical display 32.

In some examples, the configuration interface module 24 can be enabled by selecting an element (e.g., a graphical element) of a user interface generated by the host application 19.

The configuration interface generated by the configuration interface module 24 is configured for selectively enabling and disabling data field obfuscation for the host application 19.

In some examples, the configuration interface generated by the configuration interface module 24 is configured allow the host user to set and adjust which data fields on a user interface generated by the host application 19 to obfuscate when the DFO tool 23 is enabled.

The data field locator module 25 is configured to locate data fields on a user interface generated by the host application 19 that have been set via the configuration interface for obfuscation. For example, the data field locator module 25 matches, by pairing, data field identifiers input to the configuration interface to corresponding data fields generated by user interface (also referred to herein as a main user interface) generated by the host application 19. When a match is found and the DFO tool is enabled, obfuscation of the matched data field is performed.

In some examples, the data field locator module 25 operates only when the DFO tool 23 is enabled via the configuration interface.

In some examples, the data field locator module 25 is configured to perform optical character recognition (OCR) on images of a user interface generated by the host application 19 in order to locate data fields for obfuscation. For example, a social security number field may be positioned in the user interface generated by the host application 19 as an image, rather than as text. The data field locator module 25 performs OCR on the image and thereby determines that the data field corresponding to the image is one that has been set via the configuration interface for obfuscation.

The data field locator module 25 is configured to use a machine learning model (e.g., a neural network) to locate data fields for obfuscation. In some examples, the machine learning model, or components thereof, resides on a remote device that the DFO tool 23 accesses for performing data field location on a user interface generated by the host application 19. In other examples, the machine learning model, or components thereof, reside locally on the host device 12.

The machine learning model can be trained to identify and locate data fields that may contain sensitive information based on host user inputs to the configuration interface. For example, the machine learning model can learn that "ssn", "sn" and "social" input to the configuration interface for obfuscation all refer to a data field that may contain a social security number. Similarly, the machine learning model can learn that "ssn" in the user interface identifies a data field that may contain a social security number. As another example, the machine learning model can learn that "last", "surname", "sur" "last name", "ln", "family" and "family name" all refer to "last name" or a data field in which a last name may appear.

In some examples, the machine learning model can learn to locate particular data fields based on the context of those data fields within the user interface generated by the host application 19. For example, the machine learning model may learn that "last" identifies a data field that may contain a last name when the word "last" is spatially positioned within a predetermined distance from or otherwise in juxtaposition on the user interface with the word "first".

In the various manners just described, the machine learning model can learn to match identifiers set for obfuscation in the configuration interface with the appropriately corresponding data fields in the user interface generated by the host application 19.

In some examples, the data field locator module 25 is configured to perform OCR and also to use a machine learning model as described above to locate set data fields for obfuscation in the user interface generated by the host application 19.

The field obfuscation module 26 is configured, when the DFO tool 23 is enabled via the configuration interface, to automatically obfuscate the data fields located by the data field locator module 25.

In some examples, the data field obfuscation module 26 is configured to obfuscate the located data fields regardless of what data is showing in the located data fields. For instance, even for a located data field includes only non-sensitive information (e.g., a fake social security number) or no information at all, the data field obfuscation module 26 is configured to obfuscate the located data field.

As used herein, obfuscate or obfuscation refer to visual distortion.

As used herein, a data field is configured to receive data as input to the field in any one of a number of different forms, including but not limited to text and an image. If the data entered into the data field is text, the visual distortion is sufficient to render the text unreadable. If the data entered into the data field is an image, such as an image of a person's face or an image of a license plate, the visual distortion is sufficient to render the image unrecognizable, e.g., the person cannot be identified, the license plate number is unreadable, etc. Non-limiting examples of data field obfuscation include blurring the data field, covering the data field, blacking out the data field, etc., as well as combinations thereof. Other types or modalities of obfuscation may be performed by the data field obfuscation module 26.

In some examples, the data field obfuscation module 26 is configured to obfuscate a located data field even while text or other data (e.g., an image file) is being entered into or deleted from the located data field. That is, the obfuscation is configured as a visual overlay on the underlying data field without impacting the function of the data field itself.

The field obfuscation module 26 is configured, when the DFO tool 23 is enabled via the configuration interface, to automatically obfuscate the data fields located by the data field locator module 25.

The field obfuscation module 26 is configured, when the DFO tool 23 is disabled via the configuration interface, to allow text or other data in any data fields of the user interface generated by the host application 19 and identified in the configuration interface to be readable or otherwise recognizable.

The application extension module 27 is configured to operatively interface the data field obfuscation tool 23 to the host application 19 as an extension (e.g., a plugin) of the host application 19, allowing, e.g., the data field locator module to 25 to locate data fields of a user interface generated by the host application 19, the field obfuscation module 26 to obfuscate located data fields, further allowing the configuration interface module 24 to generate a graphical element on a user interface generated by the host application 19 that can be selected to generate the configuration interface, and further allowing the load interception module 28 to perform its functions.

The load interception module 28 is configured, when the DFO tool is enabled, to intercept a user interface that is being generated by the host application 19 and is loading onto a display device (e.g., the graphical display 42 and/or the graphical display 32), such that upon the interface becoming loaded onto the display device, a data field of that interface has already been located by the data field locator module 25 as corresponding to a data field identified in the configuration interface, and that located data field has already been obfuscated by the field obfuscation module 26. As a result, there is minimal or no time gap or delay between when the data fields would first become viewable by a user of, e.g., the user device 16, and when those data fields are obfuscated by the field obfuscation module 26.

The configuration storage 29 is configured to store a particular obfuscation configuration for later use in conjunction with the host application 19. For example, the obfuscation configuration can include an option for saving a particular configuration, e.g., saving a set of data field types for obfuscation when the DFO tool is enabled. The configuration can be saved to the configuration storage 29 and retrieved from the configuration storage 29 the next time the obfuscation configuration interface is opened, automatically populating the configuration interface with the saved obfuscation configuration settings. Copies of saved configuration settings can be sent to other users.

Figure 3:
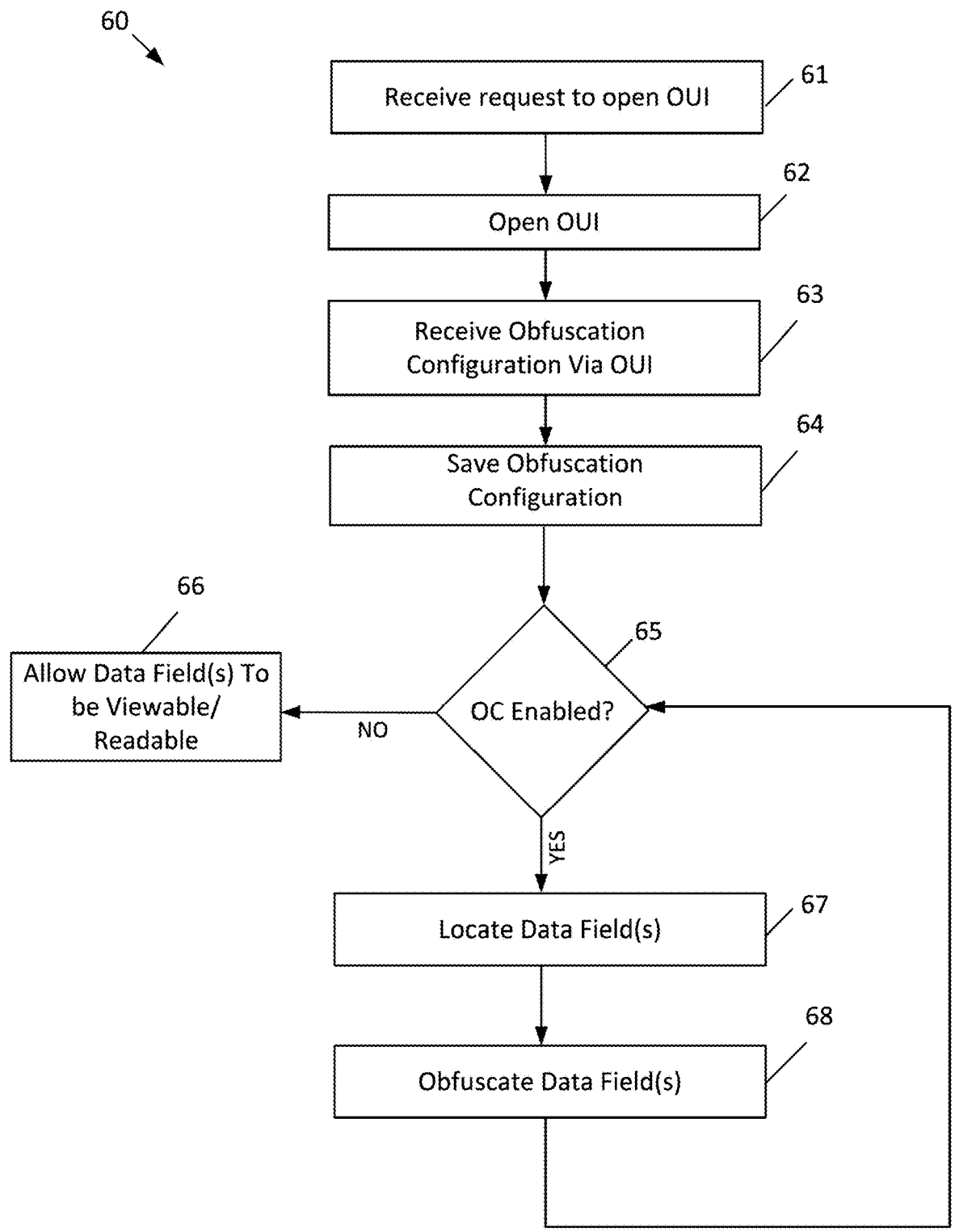
FIG. 3 is an example method that can be performed by the system of FIG. 1.

FIG. 3 is an example method 60 that can be performed by the system 10 of FIG. 1. In some examples, not all of the steps of the method 60 need to be performed. In some examples, steps of the method 60 can be performed in a different order than that illustrated in FIG. 3.

Referring to FIGS. 1-3, at a step 61 of the method 60, a request is received to open an obfuscation user interface (OUI). For example, a host user has a main user interface generated by the host application 19 open and loaded on the host device 12, viewable on the graphical display 32. The host user selects (via the I/O device 30) an option to open an OUI in order to enable, disable, or change settings of the DFO tool 23 that is an extension of the host application 19.

At a step 62 of the method 60, the OUI is opened, e.g., as an overlay over a portion of the main user interface. In some examples, the step 62 can be performed using the configuration interface module 24.

At a step 63 of the method 60, an obfuscation configuration is received via the OUI. For example, obfuscation settings are entered by the host user into the OUI and submitted to the DFO tool 23.

In some examples, at a step 64 of the method 60, the obfuscation configuration generated at the step 63 is saved for later retrieval, e.g., by storing it in the configuration storage 29.

At a step 65 of the method 60, it is determined by the field obfuscation module 26 whether the obfuscation configuration received at the step 63 has been enabled. Enabling and disabling of an obfuscation configuration can be performed using the OUI itself.

If at the step 65 it is determined that the obfuscation configuration is not enabled (e.g., is disabled), then the method 60 proceeds to the step 66, whereby all data in any data fields identified in the disabled obfuscation configuration, are allowed to be readable, recognizable, or otherwise viewable.

If at the step 65 it is determined that the obfuscation configuration is enabled, then the method proceeds to the step 67, whereby the data field locator module 25 locates any data fields of the main user interface of the host application 19 that match data fields identified for obfuscation in the obfuscation configuration.

From the step 67, the method 60 then proceeds to the step 68, at which the field obfuscation module 26 obfuscates the data fields located at the step 65.

Steps 67 and 68 continue to be performed (e.g., in a continuous loop with the step 65) as long as the obfuscation configuration remains enabled, and regardless of changes to the user interface generated by the host application 19.

Following the step 68, if the obfuscation configuration is disabled, the method 60 then reverts to the step 66, any obfuscations performed at the step 68 are removed, and all data in any data fields identified in the disabled obfuscation configuration are allowed to be readable, recognizable, or otherwise viewable.

Figure 4:
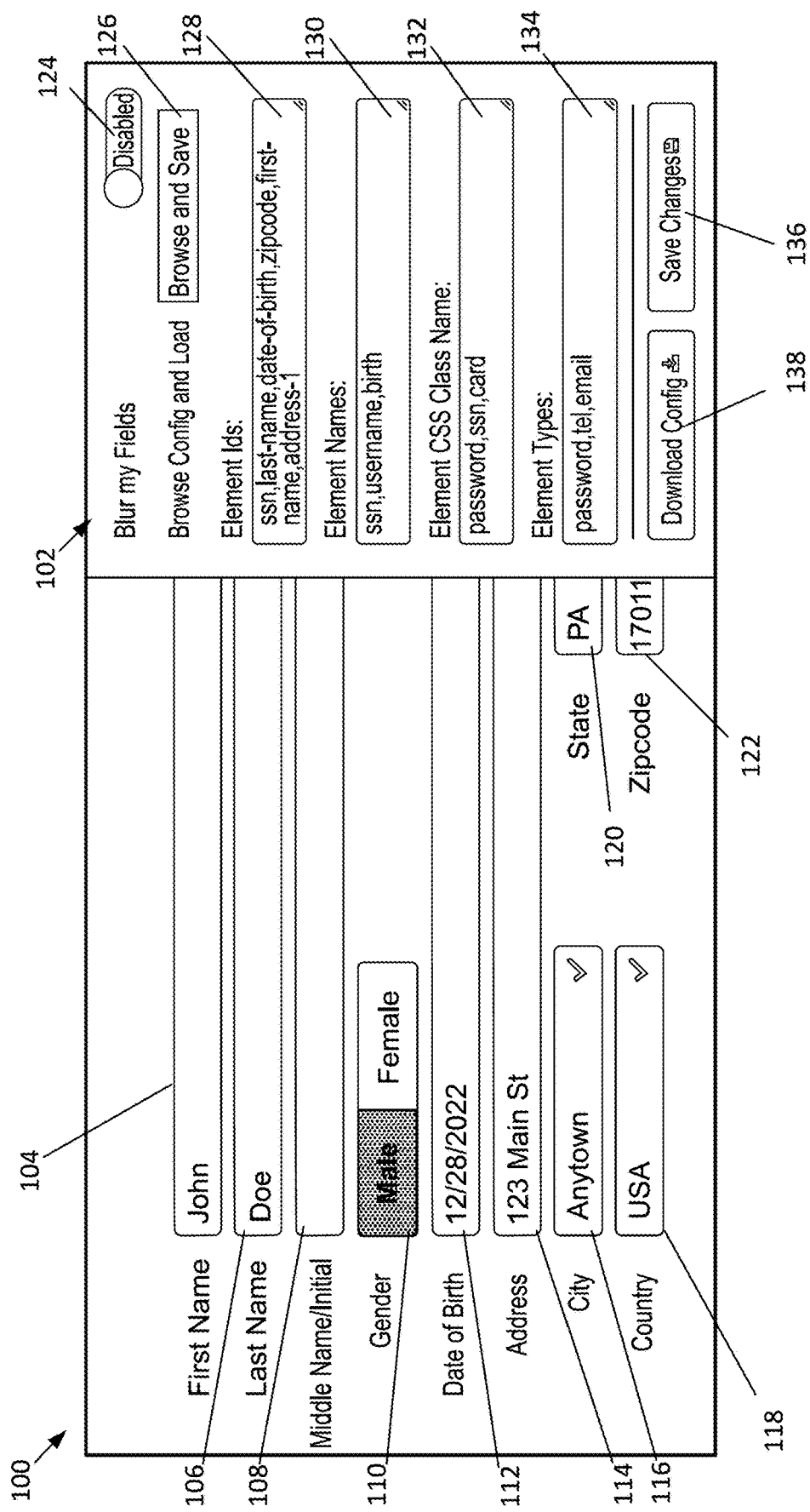
FIG. 4 shows an example main user interface and an example obfuscation user interface that can be generated by the system of FIG. 1.

FIG. 4 shows an example main user interface 100 and an example obfuscation user interface (OUI) 102 that can be generated by the system of FIG. 1.

Referring to FIGS. 1 and 4, the main user interface 100 can be generated by the host application 19 and displayed on the graphical display 32 and the graphical display 42.

The OUI 102 can be generated by the DFO tool 23 and displayed on the graphical display 32, e.g., as an overlay over a portion of the main user interface 100.

In some examples, the main user interface 100 includes a selectable element (e.g., a drop down feature from a menu bar or dashboard) to open the OUI 102.

The main user interface 100 includes several data fields. For example, the main user interface 100 can be generated by a host application 19 for processing mortgage payments. The host application is being demonstrated to a product developer. The data fields of the user interface 100 pertain to information relating to a customer of a financial institution that runs the host application 19 and manages the customer's mortgage. Thus, the data fields of the main user interface 100 can include sensitive information that should not be shared with, e.g., the product developer who is outside the financial institution.

In the example main user interface 100, the data fields include a first name field 104, a last name field 106, a middle name/initial field 108, a gender field 110, a date of birth field 112, an address field 114, a city field 116, a country field 118, a state field 120, and a zipcode field 122. All the fields but the gender field 110 are text fields. The gender field 110 includes selectable gender options, rather than a text string.

The OUI 102 includes a switch 124, such as a toggle button. The switch 124 allows the host user to selectively enable and disable the obfuscation configuration set forth in the OUI 102. In FIG. 4, the switch 124 is off or disabled, such that the data fields identified in the obfuscation configuration are all readable, recognizable, or otherwise viewable in the main user interface 100.

The OUI 102 includes an arrangement of input fields 128, 130, 132 and 134. Each input field 128, 130, 132 and 134 corresponds to a different metadata type associated with the data fields generated by the underlying host application 19. For example, if the host application is a web-based application then the different input fields 128, 130, 132 and 134 can correspond to different metadata structures (e.g., JavaScript structures, hypertext markup language (HTML) structures, Cascading Style Sheets (CSS) structures, etc.) corresponding to data fields of a webpage generated by the host application.

Different host users may be familiar with different metadata structures. Providing multiple input field options corresponding to multiple metadata structures can make the OUI 102 more accessible and user friendly and increase the likelihood that the desired data fields are actually captured for obfuscation.

The host user enters data field identifiers into one or more of the input fields 128, 130, 132, 134, such as "ssn", "password", "tel", etc. In some examples, the identifiers are formatted according to the metadata type of the input field. In other examples, the DFO tool is configured to understand (e.g., with a machine learning model) the identifiers regardless of the corresponding metadata type.

As shown in FIG. 4, the input fields 128, 130, 132 and 134 of the OUI 102 pair the data field identifiers entered by the host user with a corresponding metadata type associated with the identified data field.

The OUI 102 includes a button 136 selectable to save an obfuscation configuration to the configuration storage 29 for later access, e.g., at a later time when the host application 19 is opened and data field obfuscation is desired.

The OUI 102 includes a button 126 selectable to browse and load previously saved obfuscation configurations. For example, depending on who the main user interface 100 is being shared with or shown to, different types or scopes of information may be deemed too sensitive for those users to view. Thus, it can be beneficial to configure and save multiple different obfuscation configurations with different obfuscation settings. Depending on the specific use case, the appropriate obfuscation configuration can be retrieved using the button 126 and then enabled using the switch 124. Alternatively, an existing obfuscation configuration can be modified to suit the use context.

The OUI 102 also includes a button that can be selected to download an obfuscation configuration prepared by another user. Once downloaded, the obfuscation configuration can be stored and enabled or disabled as with any other obfuscation configuration.

Figure 5:
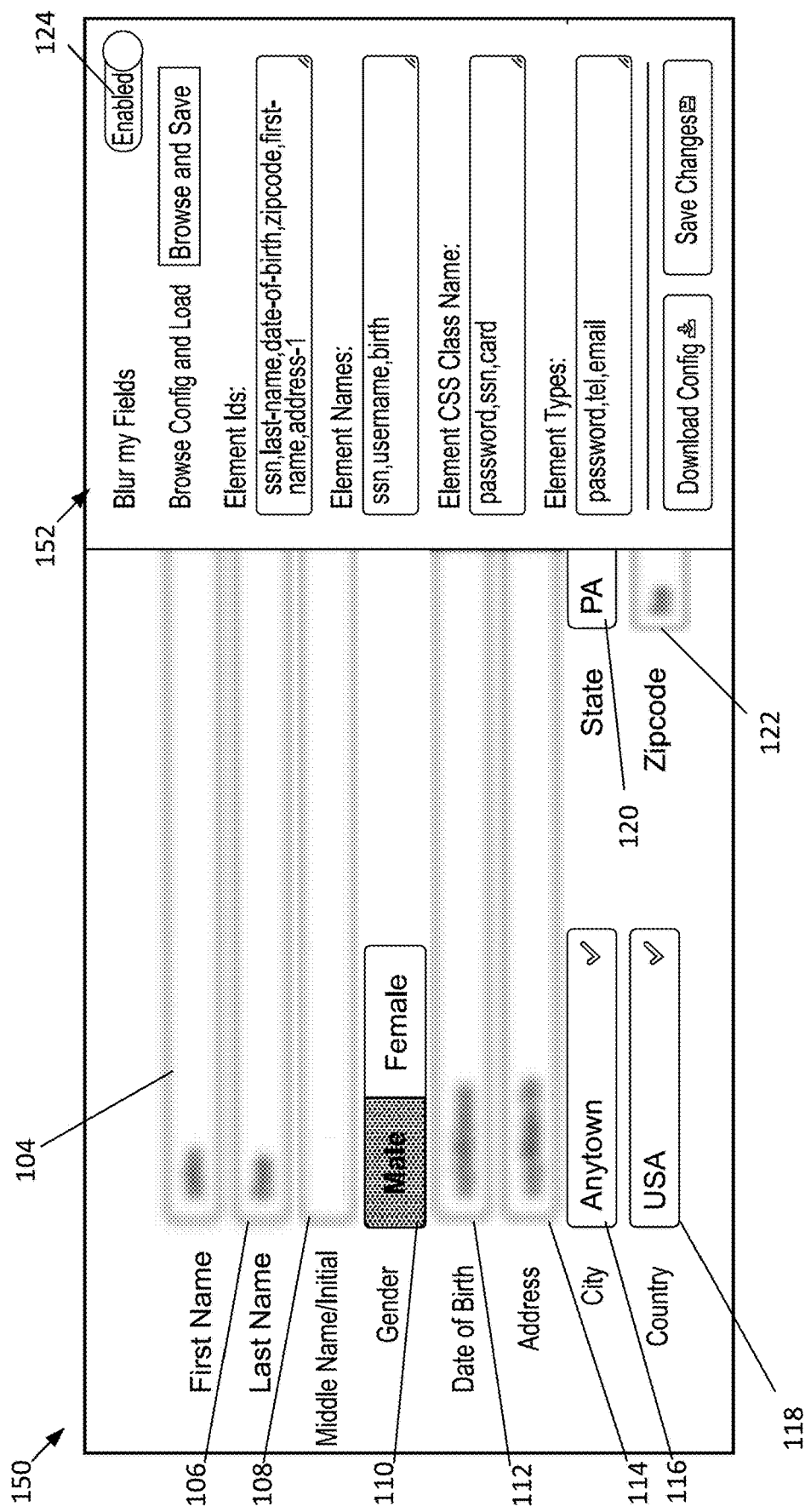
FIG. 5 shows a further example main user interface and a further example obfuscation user interface that can be generated by the system of FIG. 1.

FIG. 5 shows a further example main user interface 150 and a further example obfuscation user interface 152 that can be generated by the system of FIG. 1.

Referring to FIGS. 4-5, the main user interface 150 and the OUI 152 are generated when the host user flips the switch 124 in the OUI 102 thereby enabling the obfuscation configuration displayed in the OUI 102.

As a result of the obfuscation configuration being enabled, the data field locator module 25 and the field obfuscation module 26 (FIG. 2) operate to locate and obfuscate (in this case, by blurring) the data in the data fields of the main user interface 100, 150 identified in the obfuscation configuration of the OUI 102, 152. In particular, the data in the data fields 104, 106, 108, 112, and 122 are obfuscated because these data fields are identified in the obfuscation configuration. Obfuscation in the data fields 104, 106, 108, 112 and 122 is represented in FIG. 5 by blurring of the outline of the data field and where text appears or might appear within the outline of the data field. The data fields 110, 116, 118 and 120 are not obfuscated because the data fields are not identified in the obfuscation configuration (e.g., the information in such data fields is not deemed sensitive in the context of the current use case for sharing or showing purposes).

The identified fields are obfuscated regardless of the data that actually is present in those fields. For example, the middle name/initial field 108 is obfuscated because it was identified in the obfuscation configuration and even though the data field 110 contains no data.

The data field obfuscations appear on the main interface of the host device 12 as well as on the displays of any other devices (e.g., the user device 16) with which the host device is sharing its main user interface via the screen sharing module 17.

Additional components of the host device 12 are illustrated in FIG. 6. In this example, the host device 12 provides the computing resources to perform the functionality associated with the system 10 (FIG. 1). The user device(s) 16 and other computing resources associated with the system 10 can be similarly configured.

The host device 12 can be an internally controlled and managed device (or multiple devices) of a business enterprise. It can be associated with a single host user or multiple host users. Alternatively, the host device 12 can represent one or more devices operating in a shared computing system external to the enterprise, such as a cloud. Further, the other computing devices disclosed herein can include the same or similar components, including the user device(s) 16.

Via the network 34, any components of the host device 12 that are physically remote from one another can interact with one another, as well as with other user device(s) 16 (FIG. 10).

The host device 12 includes the processor(s) 20, a system memory 204, and a system bus 206 that couples the system memory 204 to the processor(s) 20.

The system memory 18 includes a random access memory ("RAM") 210 and a read-only memory ("ROM") 212. A basic input/output system that contains the basic routines that help to transfer information between elements within the host device 12, such as during startup, is stored in the ROM 212.

The host device 12 further includes a mass storage device 213. The mass storage device 213 can correspond to the memory 18 of the system 10 (FIG. 1). The mass storage device 213 is able to store software instructions and data, such as the host application 19 and the DFO tool 23 (FIG. 1).

The mass storage device 213 is connected to the processor(s) 20 through a mass storage controller (not shown) connected to the system bus 206. The mass storage device 213 and its associated computer-readable data storage media provide non-volatile, non-transitory storage for the host device 12. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the host device 12.

According to various embodiments of the invention, the host device 12 may operate in a networked environment using logical connections to remote network devices (such as a server and user device(s) 16 (FIG. 1)) through the network 34, such as a wireless network, the Internet, or another type of network. The host device 12 may connect to the network 34 through a network interface unit 214 connected to the system bus 206. It should be appreciated that the network interface unit 214 may also be utilized to connect to other types of networks and remote computing systems. The host device 12 also includes an input/output unit 216 for receiving and processing input from a number of other devices, including a touch user interface display screen, an audio input device, or another type of input device. Similarly, the input/output unit 216 may provide output to a touch user interface display screen or other type of output device, including, for example, the I/O device 30 (FIG. 1).

As mentioned briefly above, the mass storage device 213 and/or the RAM 210 of the host device 12 can store software instructions and data. The software instructions include an operating system 218 suitable for controlling the operation of the host device 12. The mass storage device 213 and/or the RAM 210 also store software instructions and applications 220, that when executed by the processor(s) 20, cause the host device 12 to provide the functionality of the system 10 described above (FIG. 1).

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A data field obfuscation system, comprising:
   one or more processors; and
   non-transitory computer-readable storage media encoding instructions which, when executed by the one or more processors, causes the system to:
   generate a user interface visually overlaying a main user interface, the user interface including at least one input field corresponding to a plurality of data fields of the main user interface, the user interface also including a switch element configured to selectively enable and disable a data field obfuscation tool, the data field obfuscation tool:
   when enabled via the switch element of the user interface, being configured to obfuscate the plurality of data fields of the main user interface when the plurality of data fields are identified in the at least one input field; and
   when disabled via the switch element of the user interface, being configured to allow data in the plurality of data fields of the main user interface to be viewable when the plurality of data fields are identified in the at least one input field.

2. The system of claim 1, wherein the data field obfuscation tool is configured as an extension of a host application that generates the main user interface.

3. The system of claim 2, wherein the extension does not change operability of the host application and does not change any data generated or stored by the host application.

4. The system of claim 2, wherein the host application is a web-based application.

5. The system of claim 4, wherein the host application is a web browser.

6. The system of claim 1, wherein the user interface displays a data field identifier.

7. The system of claim 6, wherein the user interface pairs the data field identifier with a metadata type associated with one of the plurality of data fields.

8. The system of claim 7,
wherein a plurality of metadata types is associated with the one of the plurality of data fields; and
wherein the user interface pairs a different data field identifier for the one of the plurality of data fields for each of the plurality of metadata types.

9. The system of claim 1, wherein the data field obfuscation tool is configured to at least one of:
(i) use a machine learning model to locate the plurality of data fields on the main user interface; and
(ii) perform optical character recognition to recognize text within a digital image on the main user interface to locate one of the plurality of data fields on the main user interface.

10. The system of claim 1, wherein the data field obfuscation tool, when enabled via the user interface, is configured to intercept another user interface that is loading onto a display device such that upon the another user interface becoming loaded onto the display device, another data field of the another user interface is already obfuscated by the data field obfuscation tool.

11. The system of claim 1, wherein the data field obfuscation tool, when enabled via the user interface, is configured to make data in the plurality of data fields unreadable or unviewable by at least one of:
blurring the plurality of data fields;
covering the plurality of data fields; and
blacking out the plurality of data fields.

12. The system of claim 1, wherein the data field obfuscation tool, when enabled via the user interface, is configured to obfuscate the plurality of data fields while data is being entered into the plurality of data fields such that the data being entered into the plurality of data fields is unreadable or unviewable.

13. The system of claim 1, wherein the main user interface includes an element that can be selected to open the user interface.

14. The system of claim 1, wherein the user interface is configured to selectively cause an obfuscation configuration for different data fields to be saved such that, when the user interface is opened, the obfuscation configuration automatically populates the user interface.

15. A computer-implemented data field obfuscation tool, comprising:
an extension for a host application that, when added to the host application, does not change operability of the host application and does not change any data generated or stored by the host application, the extension, when added to the host application, being configured to obfuscate a plurality of data fields of a main user interface generated by the host application,
wherein the data field obfuscation tool is configured to be selectively enabled and disabled with a switch element of a user interface;
wherein the user interface overlays the main user interface, the user interface including at least one input field corresponding to the plurality of data fields of the main user interface;
wherein, when enabled via the switch element of the user interface, the data field obfuscation tool is configured to obfuscate the plurality of data fields of the main user interface when the plurality of data fields are identified in the at least one input field; and
wherein, when disabled via the switch element of the user interface, the data field obfuscation tool is configured to allow data in the plurality of data fields of the main user interface to be viewable when the plurality of data fields are identified in the at least one input field.

16. The computer-implemented data field obfuscation tool of claim 15, wherein the host application is a web browser.

17. The computer-implemented data field obfuscation tool of claim 15, wherein the data field obfuscation tool is configured to at least one of:
(i) use a machine learning model to locate the plurality of data fields on the main user interface; and
(ii) perform optical character recognition to recognize text within a digital image on the main user interface to locate one of the plurality of data fields on the main user interface.

18. The computer-implemented data field obfuscation tool of claim 15, wherein the data field obfuscation tool is configured to obfuscate the plurality of data fields while data is being entered into the plurality of data fields such that the data being entered into the plurality of data fields is unreadable or unviewable.

19. A computer-implemented method of data field obfuscation, comprising:
generating a user interface visually overlaying a main user interface, the user interface including at least one input field corresponding to a plurality of data fields of the main user interface, the user interface also including a switch element configured to selectively, by a user, enable and disable a data field obfuscation tool, the data field obfuscation tool:
when enabled via the switch element of the user interface, being configured to obfuscate the plurality of data fields of the main user interface when the plurality of data fields are identified in the at least one input field; and
when disabled via the switch element of the user interface, being configured to allow text in the plurality of data fields of the main user interface to be readable when the plurality of data fields are identified in the at least one input field; and
when the data field obfuscation tool is enabled via the switch element of the user interface, executing the data field obfuscation tool to make text in the plurality of data fields unreadable and to at least one of:
(i) use a machine learning model to locate the plurality of data fields on the main user interface; and
(ii) perform optical character recognition to recognize text within a digital image on the main user interface to locate one of the plurality of data fields on the main user interface, wherein the data field obfuscation tool is configured as an extension of a host application that generates the main user interface; and wherein the extension does not change operability of the host application and does not change any data generated or stored by the host application.

\* \* \* \* \*